US 6,577,088 B2

(12) United States Patent
Heydt et al.

(10) Patent No.: US 6,577,088 B2
(45) Date of Patent: Jun. 10, 2003

(54) CLOSED LOOP SPINDLE MOTOR ACCELERATION CONTROL IN A DISC DRIVE

(75) Inventors: Jeffrey A. Heydt, Oklahoma City, OK (US); David R. Street, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 1 day.

(21) Appl. No.: 09/966,673

(22) Filed: Sep. 28, 2001

(65) Prior Publication Data

US 2002/0167287 A1 Nov. 14, 2002

Related U.S. Application Data

(60) Provisional application No. 60/267,794, filed on Feb. 9, 2001.

(51) Int. Cl.[7] .............................................. A02K 23/00
(52) U.S. Cl. ...................... 318/254; 318/138; 318/439; 318/778; 318/798
(58) Field of Search ................................. 318/254, 138, 318/439, 430, 778, 798, 809, 806, 473; 360/73.03

(56) References Cited

U.S. PATENT DOCUMENTS

| | | |
|---|---|---|
| 4,130,769 A | 12/1978 | Karube |
| 4,169,990 A | 10/1979 | Lerdman |
| 4,405,885 A | 9/1983 | Okamoto |
| 4,531,079 A | 7/1985 | Müller |
| 4,631,459 A | 12/1986 | Fujioka et al. |
| 4,633,150 A | 12/1986 | Inaji et al. |
| 4,712,050 A | 12/1987 | Nagasawa et al. |
| 4,748,386 A | 5/1988 | Nakanishi et al. |
| 4,888,533 A | 12/1989 | Gotoh et al. |
| 4,896,807 A | 1/1990 | Mundschau |
| 4,992,710 A | 2/1991 | Cassat |
| 5,001,405 A | 3/1991 | Cassat |
| 5,028,852 A | 7/1991 | Dunfield |
| 5,117,165 A | 5/1992 | Cassat et al. |
| 5,159,246 A | 10/1992 | Ueki |
| 5,166,583 A | 11/1992 | Min et al. |
| 5,184,038 A | 2/1993 | Matsui et al. |
| 5,189,574 A | 2/1993 | Imamura et al. |
| 5,254,914 A | 10/1993 | Dunfield et al. |
| 5,274,310 A | 12/1993 | Bahn |
| 5,285,135 A | 2/1994 | Carobolante et al. |
| 5,298,839 A | 3/1994 | Takeda |
| 5,334,917 A | 8/1994 | Lind |
| 5,343,127 A | 8/1994 | Maiocchi |
| 5,378,976 A | 1/1995 | Inaji et al. |
| 5,397,972 A | 3/1995 | Maiocchi |
| 5,428,276 A | 6/1995 | Carobolante et al. |
| 5,541,488 A | 7/1996 | Bansal et al. |
| 5,631,999 A | 5/1997 | Dinsmore |
| 5,703,449 A | 12/1997 | Nagate et al. |
| 5,777,448 A | 7/1998 | Matsui |
| 5,780,983 A | 7/1998 | Shinkawa et al. |
| 5,793,558 A * | 8/1998 | Codilian et al. ......... 360/78.06 |

(List continued on next page.)

Primary Examiner—Karen Masih
(74) Attorney, Agent, or Firm—Fellers, Snider, et al.

(57) ABSTRACT

Method and apparatus for accelerating a disc drive spindle motor from rest to a final operational velocity. During a low gear mode, the spindle motor is accelerated from rest to a first velocity through application of fixed duration drive pulses to the spindle motor. A high gear mode is next employed to accelerate the spindle motor from a first velocity to an intermediate velocity. Variable duration drive pulses are applied to the spindle motor each having a duration selected as a percentage of the duration of the most recently detected commutation period of the spindle motor. Once the spindle motor reaches the medium speed, commutation circuitry and back electromotive force (bemf) detection circuitry use detected bemf from the spindle motor to electronically commutate the motor to accelerate to the final operational speed.

15 Claims, 8 Drawing Sheets

U.S. PATENT DOCUMENTS

| | | |
|---|---|---|
| 5,841,252 A | 11/1998 | Dunfield |
| 5,870,363 A | 2/1999 | Sun et al. |
| 5,929,577 A | 7/1999 | Neidorff et al. |
| 5,963,706 A | 10/1999 | Baik |
| 5,982,571 A | 11/1999 | Calfee et al. |
| 5,998,946 A | 12/1999 | Kim |
| 6,078,158 A * | 6/2000 | Heeren et al. ............... 318/430 |
| 6,100,656 A | 8/2000 | El-Sadi et al. |
| 6,160,367 A | 12/2000 | Higashi et al. |
| 6,178,060 B1 * | 1/2001 | Liu .......................... 360/78.07 |

* cited by examiner

CLOSED LOOP SPINDLE MOTOR ACCELERATION CONTROL IN A DISC DRIVE

RELATED APPLICATIONS

This application claims priority to Provisional Application No. 60/267,794 filed Feb. 9, 2001.

FIELD OF THE INVENTION

The claimed invention relates generally to the field of disc drive data storage devices and more particularly, but not by way of limitation, to a method and apparatus for accelerating a disc drive spindle motor from rest to a final operational velocity.

BACKGROUND

A disc drive is a data storage device used to store digital data. A typical disc drive includes a number of rotatable magnetic recording discs which are axially aligned and mounted to a spindle motor for rotation at a high constant velocity. A corresponding array of read/write heads access tracks defined on the respective disc surfaces to write data to and to read data from the discs.

Disc drive spindle motors are typically provided with a three-phase, direct current (dc) brushless motor configuration. The phase windings are arranged about a stationary stator on a number of radially distributed poles. A rotatable spindle motor hub is provided with a number of circumferentially extending permanent magnets in close proximity to the poles. Application of current to the windings induces electromagnetic fields which interact with the magnetic fields of the magnets to apply torque to the spindle motor hub and induce rotation of the discs.

Due to the prevalence of numerous consumer devices that employ electrical motors, it might seem at first glance that accelerating a disc drive spindle motor from rest to a final operational velocity would be relatively straightforward; simply turn on the motor and let it accelerate to the final desired speed. As those skilled in the art will appreciate, however, just the opposite has proven to be the case. Accelerating a spindle motor from rest can be fraught with difficulty and involves a number of important considerations that must be adequately taken into account.

First, it is important to accurately determine the rotational state of a disc drive spindle motor prior to application of drive signals to the motor. Application of drive signals to a spindle motor while the motor is in an unknown state could lead to the inadvertent rotation of the motor in the wrong direction. Rotating the spindle motor in the wrong direction, even for a very short time, can lead to premature failure of a disc drive; heads and disc surfaces can be damaged, and lubricating fluid used in hydrodynamic spindle motor bearings can be pumped out of the bearings.

Early disc drive spindle motor designs used Hall effect or similar external sensors to provide an independent indication of motor positional orientation. However, present designs avoid such external sensors and instead use electronic commutation and back electromagnetic force (bemf) detection circuitry to provide closed-loop spindle motor control, such as discussed in U.S. Pat. No. 5,631,999 issued to Dinsmore. Such approach generally entails applying a predetermined sequence of commutation steps to the phase windings of the spindle motor over each electrical revolution (period) of the motor. A commutation step involves supplying the motor with current to one phase, sinking current from another phase, and holding a third phase at a high impedance in an unenergized state.

Detection circuitry measures the bemf generated on the unenergized phase, compares this voltage to the voltage at a center tap of the windings, and outputs a signal at a zero crossing of the voltages; that is, when the bemf voltage changes polarity with respect to the voltage at the center tap. The point at which the zero crossing occurs is then used as a reference for the timing of the next commutation pulse, as well as a reference to indicate the position and relative speed of the motor.

Above an intermediate operational speed, the control circuitry will generally be able to reliably detect the bemf from rotation of the spindle motor, and will further be able to use the detected bemf to accelerate the motor to a final operational velocity. Below this intermediate speed, however, closed-loop motor speed control using detected bemf generally cannot be used since the spindle motor will not generate sufficient bemf at such lower speeds.

Thus, a related difficulty encountered in accelerating a disc drive spindle motor from rest is getting the motor to properly and safely rotate up to the intermediate velocity so that the closed-loop motor control circuitry can take over and accelerate the motor up to the operational velocity.

Several approaches have been proposed in the prior art to accelerate a disc drive spindle motor from rest to an intermediate velocity, such as exemplified by U.S. Pat. No. 5,117,165 issued to Cassat et al. This reference generally discloses determining the electrical rotational position of a spindle motor to determine the commutation state of the motor; that is, to determine the appropriate commutation pulses that should be applied to accelerate the motor based on the then-existing motor position. Drive pulses of fixed duration are applied to the motor to induce torque and initiate rotation of the motor, and the electrical rotational position of the motor is measured between application of each successively applied, fixed duration pulse.

Once the motor rotates sufficiently to induce a change in commutation state, the next set of drive pulses are applied, and position measurements are taken between the application of each set of the drive pulses as before. As the motor achieves a higher rotational velocity due to the successive "nudging" provided by the drive pulses, the time between successive commutation states becomes shorter, decreasing the number of drive pulses applied during each commutation state.

Eventually, an upper limit on the achievable rotational velocity will be encountered using this approach. This upper limit is generally reached as the combined time for the drive pulses and position measurement approaches one half the commutation time. As the motor velocity approaches this upper limit, an uneven, cogging action will typically be induced in the motor because the drive pulses are not synchronized with the motor rotation; that is, the drive pulses are not applied when the windings and magnets are optimally aligned for each new commutation state. Such operation does not generally harm the motor, but does result in less than efficient operation and limits the torque that can be applied to the motor. This cogging action ultimately acts as a velocity governor and undesirably induces variation in the rotational velocity of the motor.

The final velocity achieved by this approach must be high enough to enable a hand off to the motor control circuitry; that is, the final velocity must be high enough to enable the spindle motor to generate bemf that can be detected and used by the bemf detection circuitry. However, the particular velocity at which bemf is reliably generated is a function of the motor construction, and recent generation high performance spindle motor designs with higher operational velocities and fewer numbers of poles have been found to require a higher intermediate velocity before sufficient bemf is generated to allow frequency lock by the motor control circuitry.

Moreover, the motor speed variation increases as the motor velocity reaches the upper limit, and such variation makes it more difficult for the motor control circuitry to obtain frequency lock on the spindle motor. Thus, as disc drive manufacturers implement spindle motor designs with ever higher levels of performance, it is becoming increasingly difficult for prior art motor start up routines to accelerate the spindle motors to a sufficient velocity to enable the motor control circuitry to take over and implement closed-loop acceleration up to the operational velocity.

Accordingly, there is a need for improvements in the art whereby a high performance spindle motor can be reliably accelerated from rest to an operational velocity. It is to such improvements that the present invention is directed.

SUMMARY OF THE INVENTION

In accordance with preferred embodiments, a disc drive includes a spindle motor, back electromagnetic force (bemf) detection circuitry which detects bemf from rotation of the spindle motor above an intermediate velocity, commutation circuitry which electrically commutates the spindle motor in relation to the detected bemf over a range of commutation states, and control circuitry which directs the acceleration of the spindle motor from rest to a final operational velocity.

During a low gear mode, the spindle motor is initially accelerated from rest to a first velocity by applying short, fixed duration drive pulses to the spindle motor. Each drive pulse is preferably followed by two quick position measurements. The drive pulses and measurements continue until a commutation transition is detected, after which a new set of drive pulses appropriate for the new commutation state (and position measurements) are applied.

Once the first velocity is reached, a high gear mode is employed wherein the spindle motor is accelerated from the first velocity to an intermediate velocity greater than the first velocity. Variable duration drive pulses are applied to the spindle motor and successive spindle motor commutation state transitions are detected. The variable duration of each successive drive pulse is established in relation to a most recent commutation period comprising the elapsed time between the two most recently detected state transitions. Only one variable duration drive pulse is preferably applied during each commutation state, after which position measurements are repeatedly made while the spindle motor coasts to the next state transition.

Thereafter, the spindle motor is accelerated from the intermediate velocity to the final operational velocity using the commutation circuitry and bemf detection circuitry. Zero crossings are detected in relation to bemf from the spindle motor and the zero crossings are used to time the application of subsequent commutation pulses to the motor.

Preferably, operation during low gear mode includes steps of identifying the initial commutation state of the spindle motor while the spindle motor is at rest, and repetitively applying a fixed duration drive pulse and measuring electrical rotational position of the spindle motor until a transition to the next commutation state is detected. The drive pulses and measurements are repeated until the first velocity is reached.

Operation during high gear mode preferably includes steps of measuring the duration of the most recent commutation period, calculating a drive pulse duration in relation to the duration of the most recent commutation period and a scale factor so that the drive pulse duration is less than the duration of the most recent commutation period, applying a drive pulse with the calculated drive pulse duration to the spindle motor, and repetitively measuring electrical rotational position of the spindle motor until a transition to the next commutation state is detected. The foregoing steps are repeated until the intermediate velocity is reached. The scale factor can be a constant, or can vary in relation to variations in the rotational velocity of the spindle motor. Once the intermediate velocity is reached, the spindle motor is accelerated to the operational velocity using back electromotive force (bemf) detection.

By accelerating the spindle motor in this manner, smooth and continuous transitions in spindle motor velocity are obtained, and cogging and reverse rotation of the spindle motor are avoided.

These and various other features and advantages which characterize preferred embodiments of the present invention will be apparent from a reading of the following detailed description and a review of the associated drawings.

BRIEF DESCRIPTION OF THE DRAWINGS

FIG. 6 is a graphical representation of a sensed voltage and a corresponding timing measurement obtained using the RPS circuitry of FIG. 4 during the steps of the flow chart of FIG. 5.

DETAILED DESCRIPTION

Figure 1:
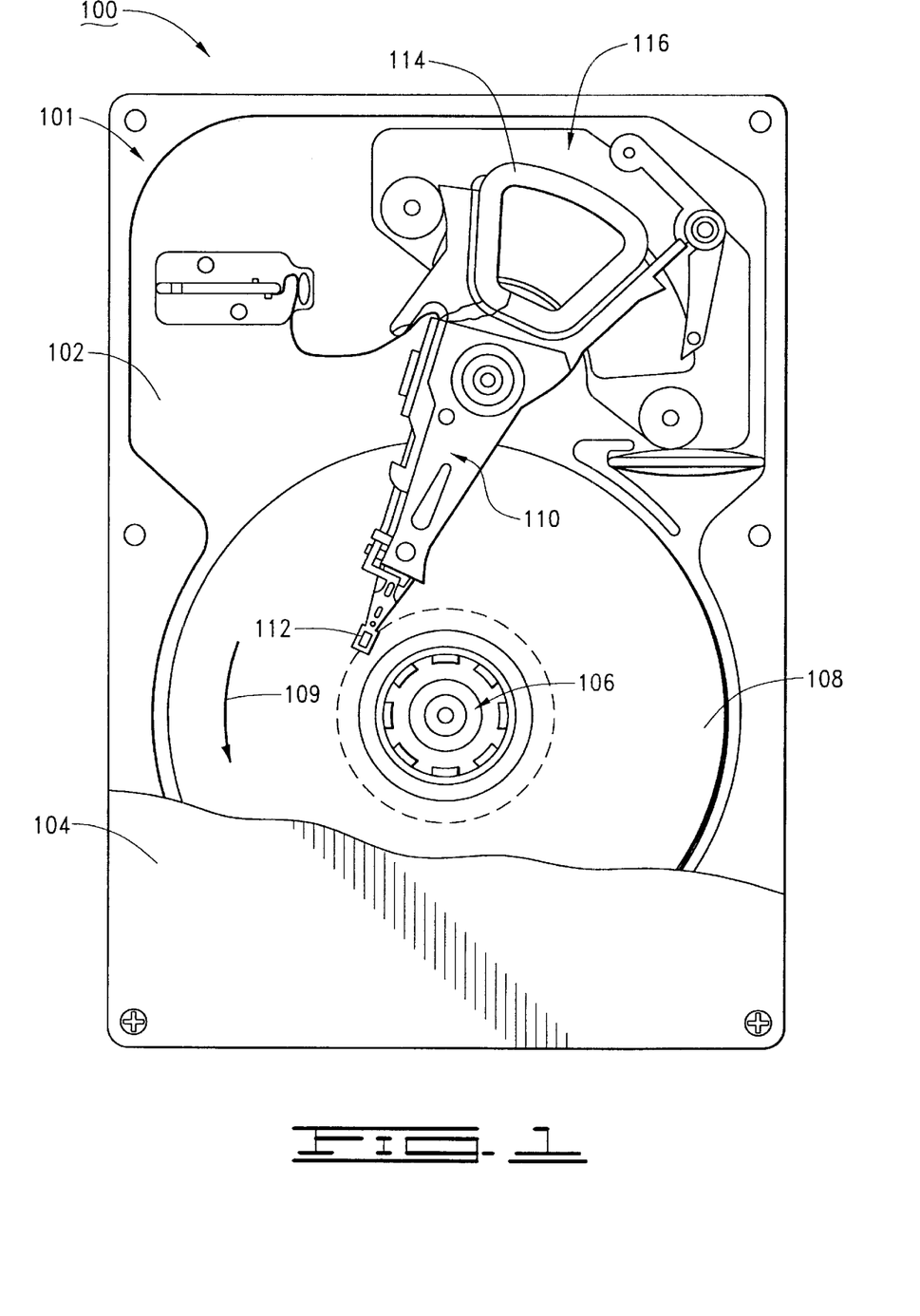
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 in a rotational direction 109. An actuator assembly 110 supports an array of read/write heads 112 adjacent the respective disc surfaces. The actuator assembly 110 is rotated through the application of current to an actuator coil 114 of a voice coil motor (VCM) 116.

Figure 2:
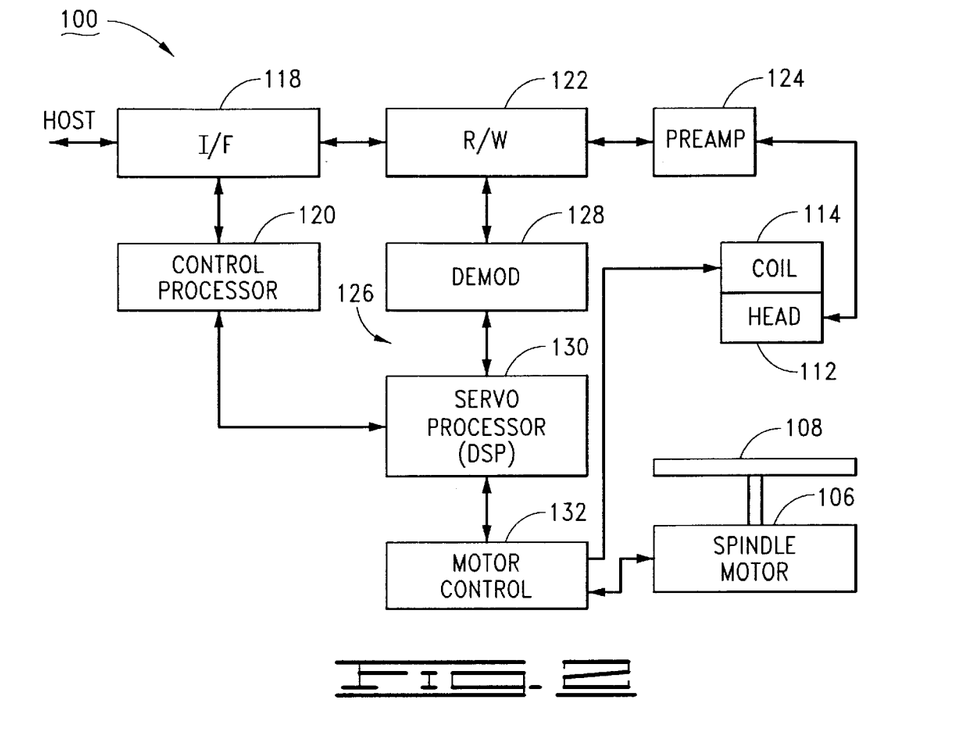
FIG. 2 provides a functional block diagram of the disc drive of FIG. 1.

FIG. 2 provides a functional block diagram of the disc drive 100. FIG. 2 includes control circuitry provided on a disc drive printed circuit board (PCB) affixed to the underside of the HDA 101, and thus not visible in FIG. 1.

Data and host commands are provided from a host device to the disc drive 100 using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130 (preferably comprising a digital signal processor, or DSP) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
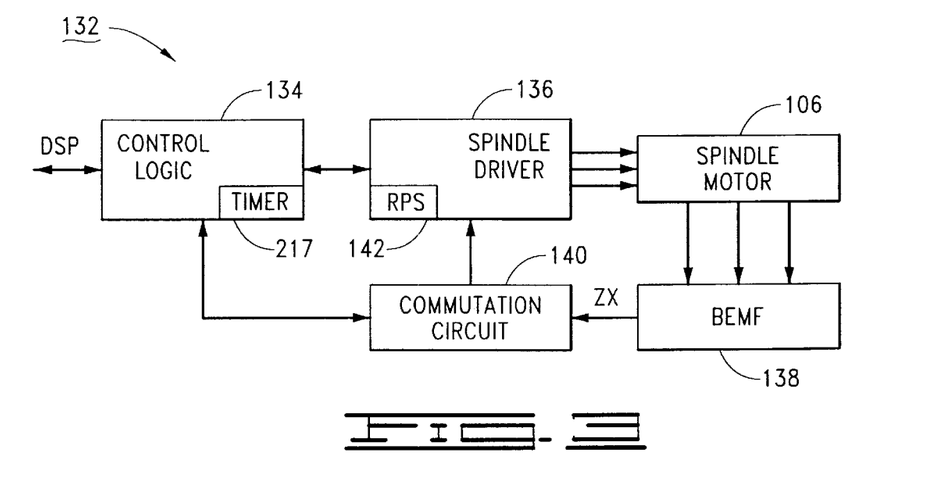
FIG. 3 provides a functional block diagram of relevant portions of the motor control circuitry of FIG. 2.

FIG. 3 provides a functional block diagram of relevant portions of the motor control circuitry 132 of FIG. 2. Control logic 134 receives commands from and outputs state data to the DSP 130. Spindle driver circuitry 136 applies drive currents to the phases of the spindle motor 106 over a number of sequential commutation steps to rotate the motor. During each commutation step, current is applied to one phase, sunk from another phase, and a third phase is held at a high impedance in an unenergized state.

Back electromagnetic force (bemf) detection circuitry 138 measures the bemf generated on the unenergized phase, compares this voltage to the voltage at a center tap, and outputs a zero crossing (ZX) signal when the bemf voltage changes polarity with respect to the voltage at the center tap. A commutation circuit 140 uses the ZX signals to time the application of the next commutation step.

Figure 4:
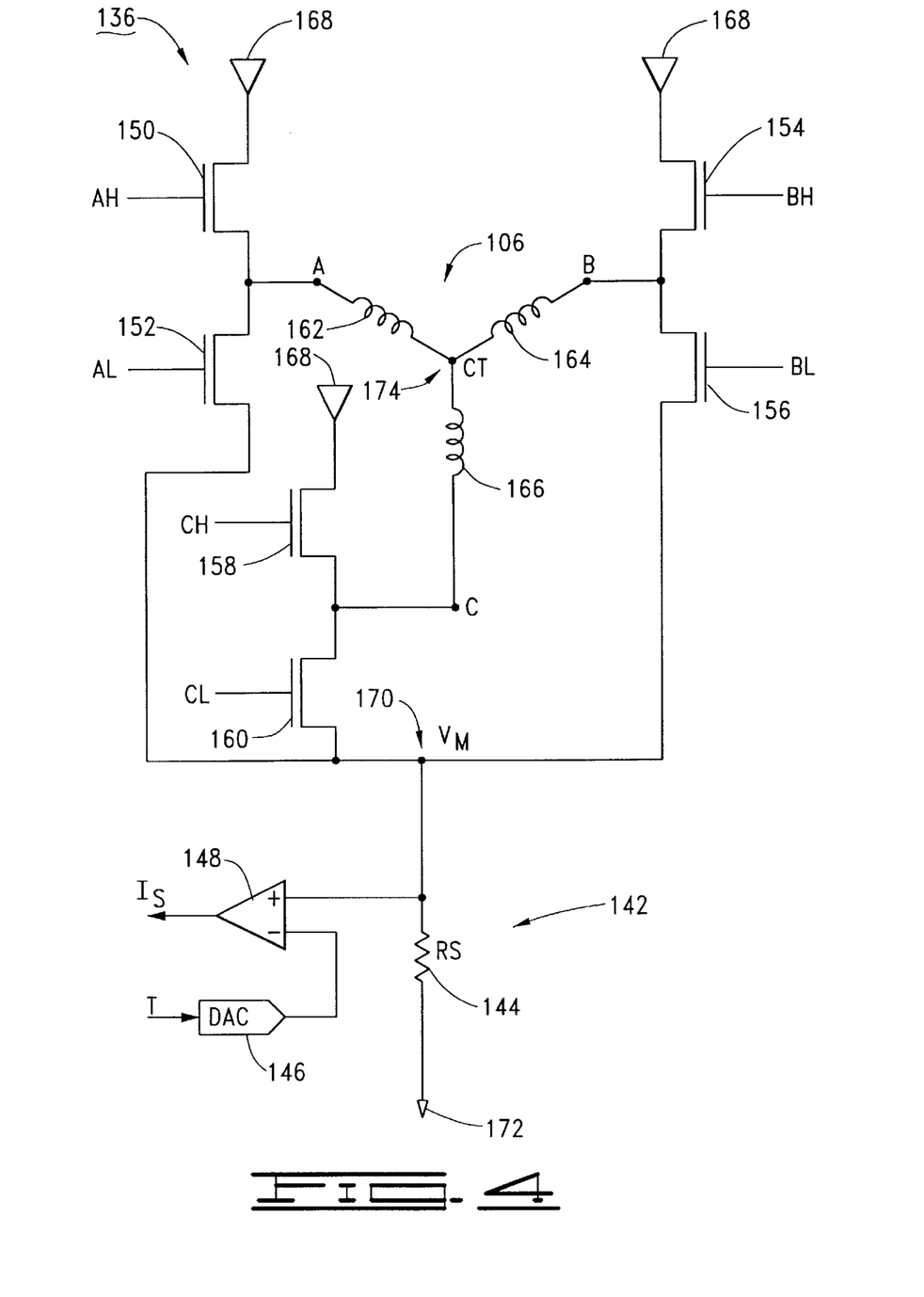
FIG. 4 provides a schematic representation of rotor position sense (RPS) circuitry of the motor control circuitry of FIG. 3.

The spindle driver circuitry 136 includes rotor position sense (RPS) circuitry 142 to detect electrical position of the spindle motor 106 in a manner to be discussed shortly. At this point it will be noted, with reference to FIG. 4, that the RPS circuitry 142 includes a sense resistor RS 144, a digital to analog converter (DAC) 146 and a comparator 148. FIG. 4 also shows the spindle driver circuitry 136 to include six field effect transistors (FETs) 150, 152, 154, 156, 158 and 160, with inputs denoted as AH (A high), AL (A low), BH, BL, CH and CL, respectively. Controlled, timed application of drive currents to the various FETs result in flow of current through A, B and C phase windings 162, 164 and 166 from a voltage source 168 to $V_M$ node 170, through the RS sense resistor 144 to reference node (ground) 172. Spindle motor commutation steps (states) are defined in Table 1:

TABLE 1

| Commutation State | Source Phase | Sink Phase | Phase Held at High Impedance |
|---|---|---|---|
| 1 | A | B | C |
| 2 | A | C | B |

TABLE 1-continued

| Commutation State | Source Phase | Sink Phase | Phase Held at High Impedance |
|---|---|---|---|
| 3 | B | C | A |
| 4 | B | A | C |
| 5 | C | A | B |
| 6 | C | B | A |

During commutation step 1, phase A (winding 162) is supplied with current, phase B (winding 164) outputs (sinks) current, and phase C (winding 166) is held at high impedance. This is accomplished by selectively turning on AH FET 150 and BL FET 156, and turning off AL FET 152, BH FET 154, CH FET 158 and CL FET 160. In this way, current flows from source 168, through AH FET 150, through A phase winding 162, through the center tap (CT node 174), through B phase winding 164, through BL FET 156 to $V_M$ node 170, and through RS sense resistor 144 to ground 172. The resulting current flow through the A and B phase windings 162, 164 induce electromagnetic fields which interact with a corresponding array of permanent magnets (not shown) mounted to the rotor (spindle motor hub), thus inducing a torque upon the spindle motor hub in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the spindle motor is determined by the number of poles. With 3 phases, a 12 pole motor will have four electrical revolutions for each mechanical revolution of the spindle motor.

The frequency at which the spindle motor 106 is commutated, referred to as the communication frequency FCOM, is determined as follows:

$$\text{FCOM} = (\text{phases})(\text{poles})(\text{RPM})/60 \quad (1)$$

A three-phase, 12 pole spindle motor operated at 15,000 revolutions per minute would produce a commutation frequency of:

$$\text{FCOM} = (3)(12)(15,000)/60 = 9,000 \quad (2)$$

or 9 kHz. The commutation circuit 140 will thus commutate the spindle driver 136 at nominally this frequency to maintain the spindle motor 106 at the desired operational velocity of 15,000 rpm. The foregoing relations can be used to determine the actual motor speed (and therefore speed error) in relation to the frequency at which the zero crossing ZX pulses are provided from the bemf detection circuitry 138.

Figure 5:
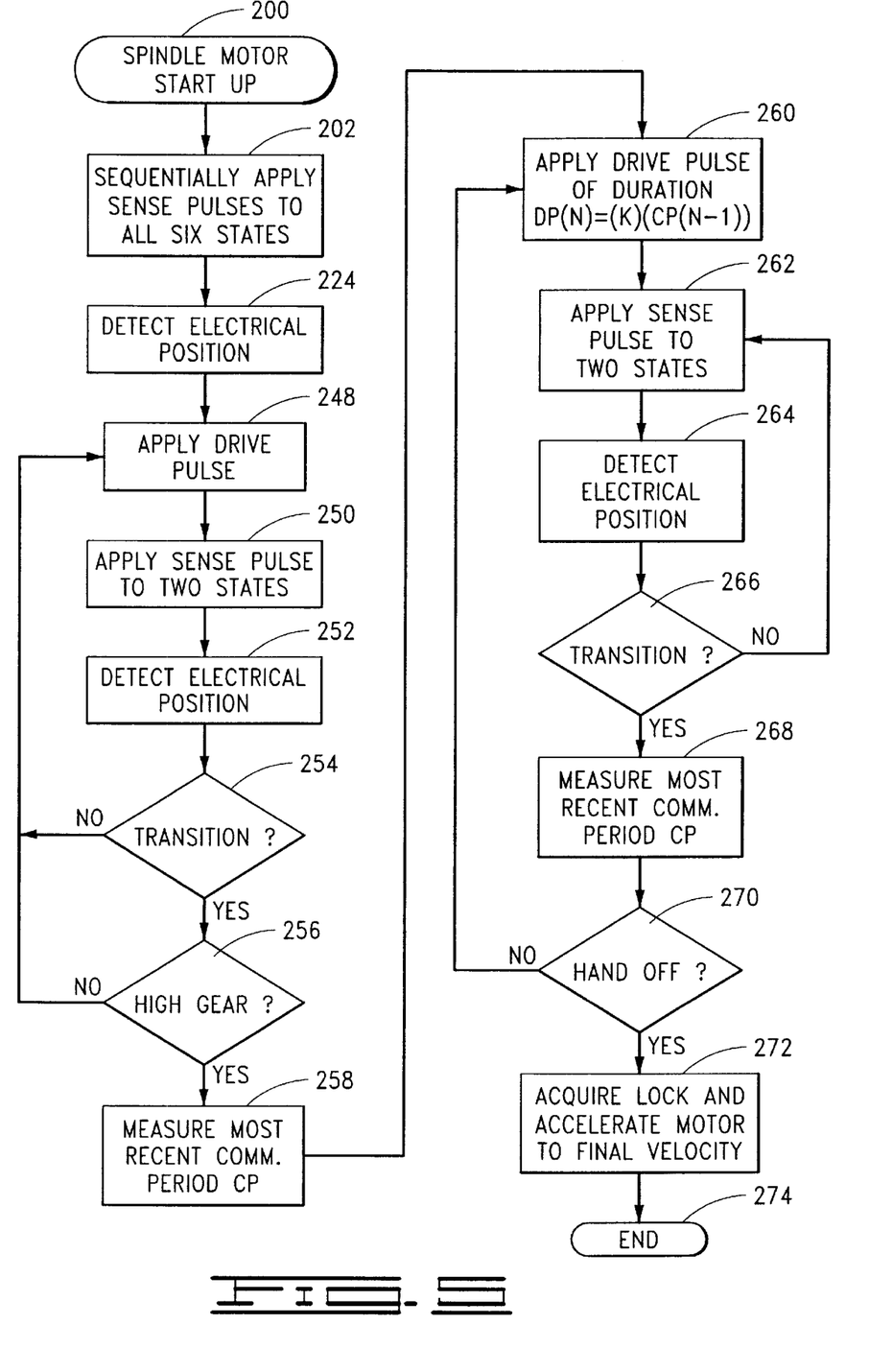
FIG. 5 is a flow chart for a SPINDLE MOTOR START UP routine illustrative of steps carried out in accordance with preferred embodiments of the present invention to accelerate the spindle motor from rest to a first velocity, from the first velocity to an intermediate velocity, and then from the intermediate velocity to an operational velocity.

Having concluded a review of relevant circuitry of the disc drive 100, reference is now made to FIG. 5 which provides a flow chart for a SPINDLE MOTOR START UP routine 200 illustrative of steps carried out by the disc drive 100 in accordance with preferred embodiments of the present invention to accelerate the spindle motor 106 from rest to a final operational velocity.

More particularly, as explained below the routine accelerates the spindle motor from rest to a first velocity in a "low gear" mode, accelerates the motor from the first velocity to an intermediate velocity in a "high gear" mode, and then finally accelerates the motor from the intermediate velocity to the operational velocity using bemf control. For clarity, the first velocity is defined as a relatively low velocity of the motor. The intermediate velocity is defined as a medium velocity between the low velocity and the operational velocity, with the intermediate velocity high enough to enable the spindle motor to generate bemf at a sufficient level for the bemf detection circuitry to reliably detect the bemf and output zero crossing (ZX) signals. The operational velocity is the final velocity at which the spindle motor is normally operated during data transfer operations.

These respective velocities can take any number of relative values depending on the particular application, and are generally related to the specific construction of the spindle motor. For purposes of the present discussion, exemplary values are about 250 revolutions per minute (rpm) for the first velocity, about 1,000 rpm for the intermediate velocity and about 15,000 rpm for the operational velocity.

The routine initially proceeds to determine the electrical rotational position of the spindle motor 106. At step 202, the motor driver circuitry 132 applies sense pulses to all six commutation states and uses the RPS circuitry 142 to measure the associated rise time of the voltage at $V_M$ node 170. The sense pulses are of small enough amplitude and duration so as to not impart a torque to the spindle motor sufficient to induce movement of the motor, but the pulses are provided with sufficient amplitude and duration to enable detection of the electrical position of the spindle motor 106. FIG. 6 provides a graphical illustration of the operation of this step.

FIG. 6 provides a $V_M$ voltage signal curve 210 and a corresponding Is pulse curve 212, plotted against a common elapsed time x-axis 214 and a common amplitude y-axis 216. Using the commutation state 1 discussed above by way of example, a small duration pulse is applied by the controlled activation of AH and BL FETs 150, 156 (FIG. 4). A timer 217 (preferably disposed in the control logic block 134, FIG. 3) is initiated at this time (time $t_0$). A suitable digital value for a threshold T is input to the DAC 146 (FIG. 4, also preferably by the control logic 134). The resulting voltage at $V_M$ node 170 will rise in relation to the impedance of the spindle motor 106, and the impedance of the spindle motor 106 will vary depending upon the electrical position of the motor.

The comparator 148 is configured to receive the $V_M$ voltage at its +input and the (analog equivalent) threshold voltage T at its −input. When the $V_M$ voltage eventually reaches the threshold level T (as indicated by broken threshold line 218 in FIG. 6), the comparator will output an $I_S$ pulse 220, as shown in FIG. 6. The receipt of the $I_S$ pulse will cause the control logic 134 to stop the timer (time $t_1$), report the elapsed time between $t_0$ and $t_1$, and instruct the spindle driver circuitry 136 to cease further application of the drive pulse (i.e., AH and BL FETs 150, 156 are turned off). For clarity, the remaining shape of the voltage $V_M$ after time $t_1$ is shown in FIG. 6 in broken line fashion at 222, to illustrate what voltage would have continued to have been observed at the $V_M$ node 170 had the pulse not been truncated by the control logic 134.

Figure 7:
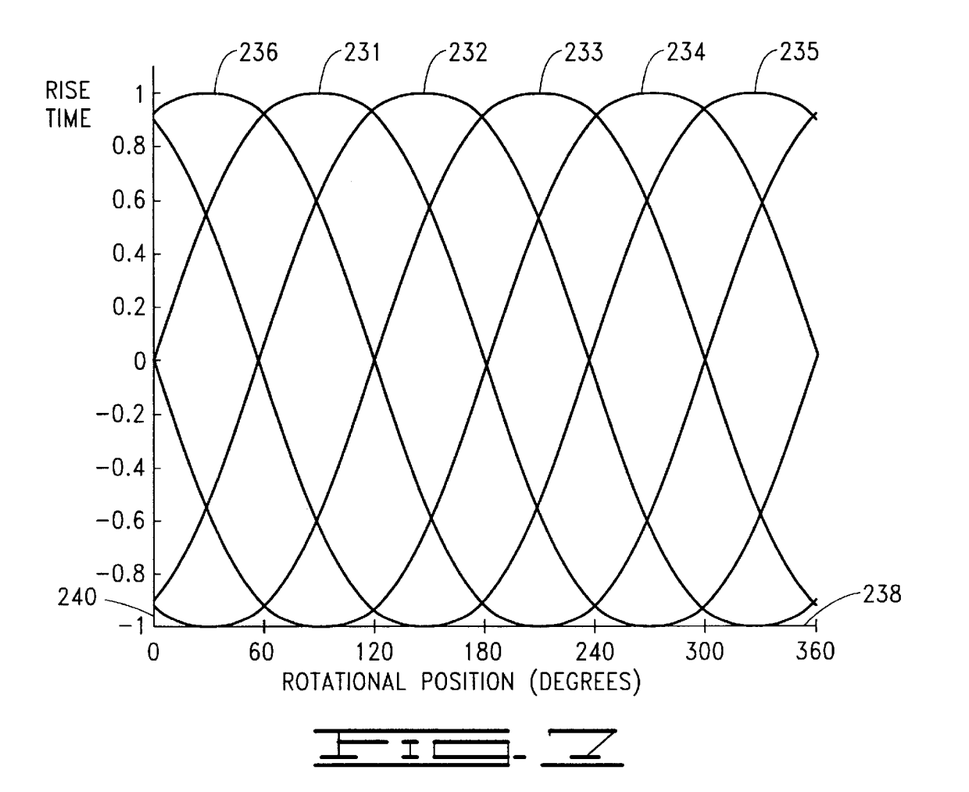
FIG. 7 is a graphical representation of rise times versus electrical position for each commutation state of the spindle motor.
Figure 8:
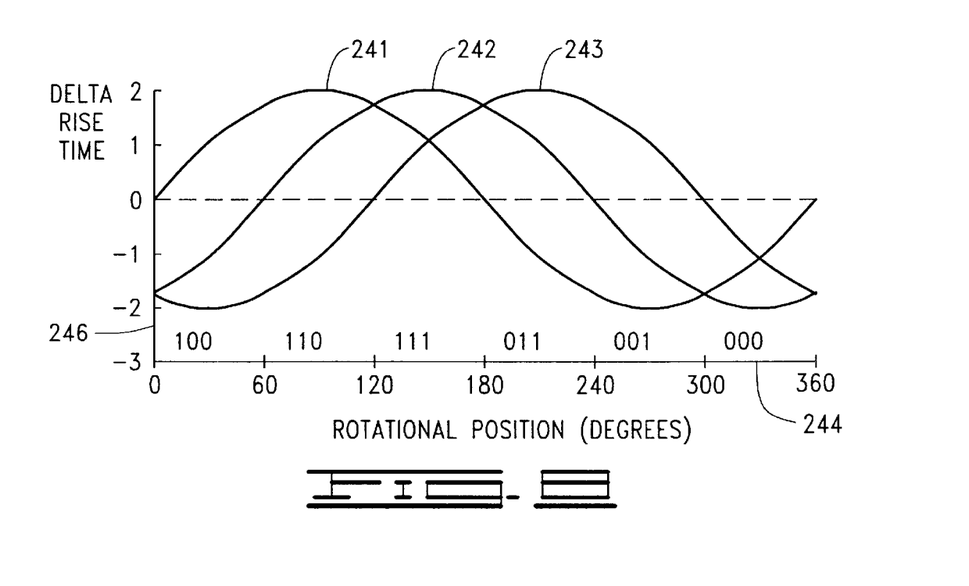
FIG. 8 is a graphical representation of differences in rise times (delta rise times) versus electrical position for each commutation state.

The foregoing operation is thus performed during step 202 for each of the six commutation states in turn, and an elapsed time (time $t_0$ to $t_1$) is obtained for each of the six commutation states. The routine of FIG. 5 passes to step 224 where the elapsed times are used to detect the electrical position of the spindle motor 106. FIGS. 7 and 8 have been provided to illustrate how this is preferably accomplished.

FIG. 7 provides a graphical representation of rise time versus electrical (rotational) position for each of the six commutation states of Table 1. Particularly, FIG. 7 provides substantially sinusoidal curves 231, 232, 233, 234, 235 and 236 plotted against position x-axis 238 and rise time y-axis 240. The curves are normalized over a range of +1 to −1 and correspond to the six commutation states of Table 1 as follows: curve 231 represents the normalized rise time for commutation state 1, curve 232 corresponds to commutation state 2, and so on. The curves are complimentary in nature: state 1 (curve 231) is the complement of state 4 (curve 234); state 2 is the complement of state 5 (curve 235); and state 3 is the complement of state 6 (curve 236). This is to be expected since, as shown by Table 1, the commutation of step 1 (application of current to phase A and the sinking of current from phase B) is the direct opposite of commutation step 4 (application of current to phase B and the sinking of current from phase A).

The differences in rise times between each pair of complementary states are plotted in FIG. 8, which provides delta rise time curves 241, 242 and 243 shown against electrical rotational position x-axis 244 and normalized amplitude y-axis 246. It can readily be seen from a comparison of FIGS. 7 and 8 that delta curve 241 represents the difference (delta) between states 1 and 4 (curves 231 and 234); delta curve 242 represents the difference between states 2 and 5 (curves 232 and 235); and delta curve 243 represents the difference between states 3 and 6 (curves 233 and 236).

It can further be seen from review of FIG. 8 that the electrical position of the spindle motor 106 can be expressed as a three-digit binary number corresponding to each of six zones of the commutation cycle. For example, in the first zone, when the spindle motor 106 is in an electrical position of between zero and 60 degrees, the values of the delta curves 241, 242 and 243 have corresponding values of {01,0,0}. That is, the curve 241 has a positive value greater than zero (which is assigned a value of one) and the curves 242, 243 have negative values less than zero (and are assigned values of zero). As the spindle motor 106 rotates to a position between 60 and 120 electrical degrees, the delta curve 242 (representing the difference between states 2 and 5) will transition from a negative to a positive value, resulting in a change of position to {01,1,0 }. As the spindle motor 106 continues to rotate, one of the values in the three-digit binary position set will transition from a zero to a one or vice versa as each successive zone is encountered.

These observations are advantageous for at least two reasons: first, the electrical position (zone) of the spindle motor 106 can readily be determined in relation to the elapsed rise times for all six commutation states. Calculations can be made in accordance with the graphs of FIGS. 7 and 8, or predefined lookup tables can be used to identify the electrical position from the measured values. Second, once the electrical position (zone) of the spindle motor 106 is determined, subsequent measurements of electrical position can be limited to just those two commutation states that will next undergo a transition in delta value. For example, if the spindle motor 106 is determined to be in the first zone, subsequent measurements only need be made of states 2 and 5 to detect passage of the spindle motor 106 into the second zone.

Returning to the routine of FIG. 5, the routine proceeds to slowly accelerate the spindle motor 106 in the aforementioned low gear mode. At step 248, a fixed duration drive pulse of is applied to the spindle motor 106. This drive pulse is of sufficient duration and amplitude to initiate rotation of the spindle motor hub in the desired direction.

Immediately after application of the drive pulse at step 248, sense pulses are applied at step 250 to the two appropriate states that will change when the motor rotates into the next zone, and rise times are measured for these two states in the manner described above. The electrical position of the spindle motor 106 is detected at step 252, and an inquiry is made at decision step 254 to determine whether the motor has transitioned to the next commutation state. If not, steps 250 and 252 are successively repeated until this transition is detected, after which a new drive pulse (of the same fixed duration as the first pulse) is applied to the spindle motor 106 in relation to the new commutation state.

Figure 9:
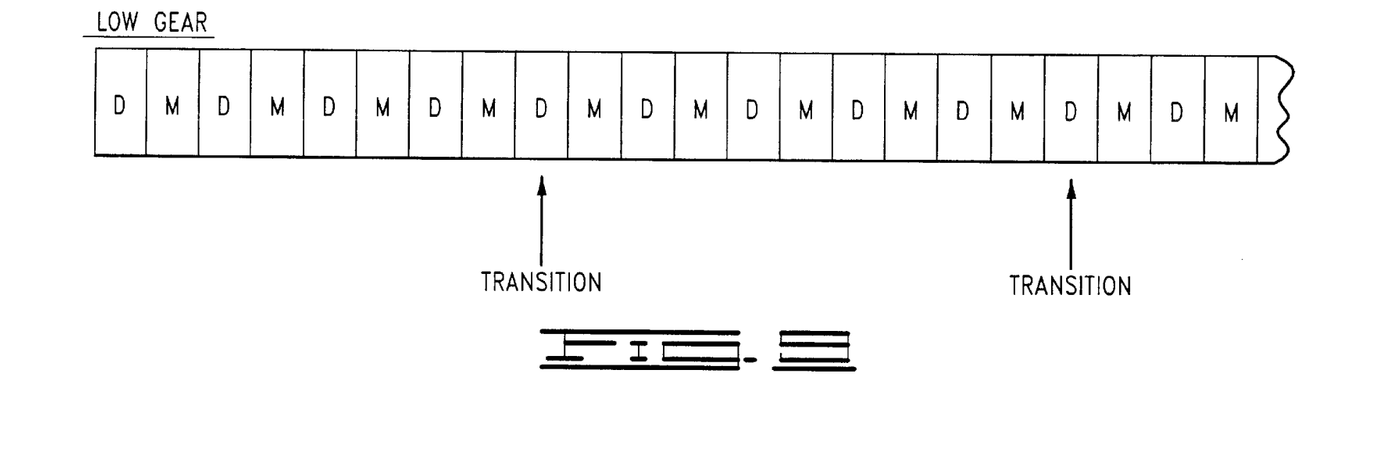
FIG. 9 provides a timing diagram to illustrate operation of the disc drive during low gear mode.

These operations are shown in the timing diagram of FIG. 9; the "D" blocks correspond to the operation of step 248, and the measurement "M" blocks correspond to the operation of steps 250, 252 and 254. It will be noted that fewer "D" and "M" operations will be required for each commutation state as the motor continues to accelerate, and the rotational velocity of the motor can be determined in relation to the elapsed time intervals between successively detected commutation state transitions (commutation periods).

Once the spindle motor 106 reaches the first velocity, such as around 250 rpm, the routine transitions to the high gear mode, as indicated by decision step 256 in FIG. 5. The high gear mode is used to accelerate the spindle motor 106 up to the intermediate velocity (such as around 1000 rpm). The routine passes to step 258 where the duration of the most recently detected commutation period, CP, is determined. At step 260, a drive pulse is applied to the spindle motor 106 having a duration determined in relation to the most recently detected commutation period, such as provided by the following relation:

$$DP(n)=(K)(CP(n-1)) \quad (3)$$

where n denotes each period, DP(n) is the duration of the drive pulse for the nth period, CP(n−1) is the duration of the previous commutation period, and K is a derating factor less than one. K can be maintained constant, or can vary over time. For example, in one embodiment the value of K is initially provided a value of 0.75 for a motor velocity around 250 rpm, and this value is successively reduced to a value of around 0.33 as the motor velocity approaches the intermediate velocity (1,000 rpm).

Figure 10:
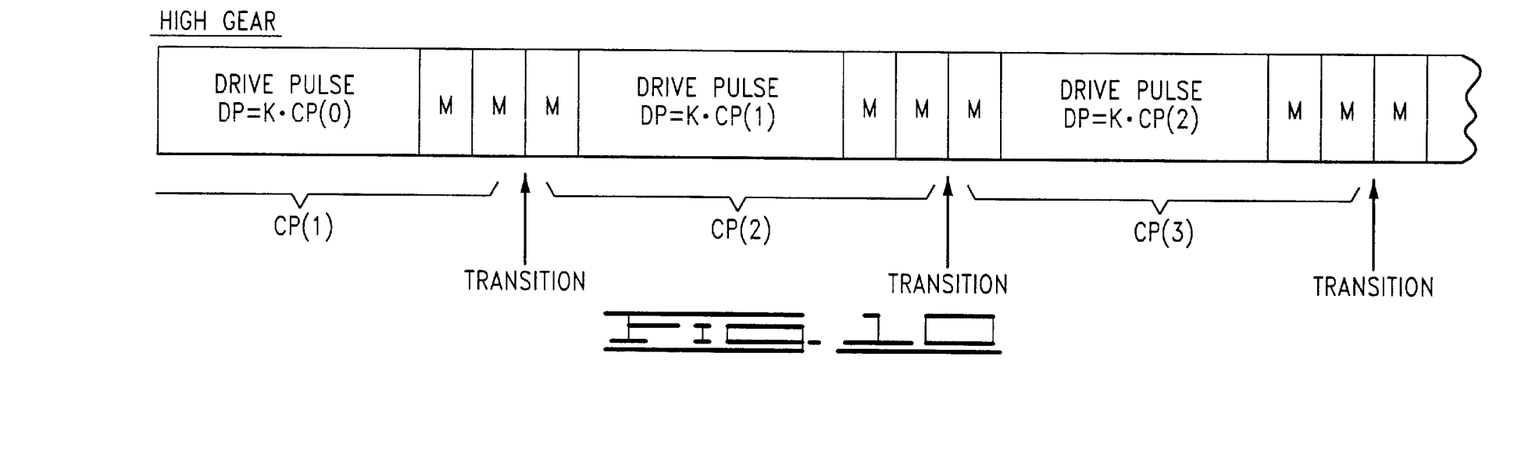
FIG. 10 provides a timing diagram to illustrate operation of the disc drive during high gear mode.

At the conclusion of the drive pulse of step 260, sense pulses are applied to the two appropriate states and resulting rise times are measured at step 262. The rise times are used to detect electrical rotational position at step 264. Decision step 266 inquires as to whether a transition in commutation state has occurred. Once the next transition has been detected, the most recent commutation period is measured at step 268. This enables the motor control circuitry 132 to determine the present velocity of the spindle motor. If the velocity is less than the intermediate velocity, as shown by decision step 270, the routine passes back to step 260 for the application of the next drive pulse. These operations are illustrated by the timing diagram of FIG. 10.

Once the spindle motor 106 reaches the intermediate velocity, the motor control circuitry 132 passes from the high gear mode to steady-state (normal) closed-loop control mode. The resulting hand off in control is shown by passage of the routine from decision step 270 to step 272, wherein the motor control circuitry 132 acquires frequency lock from the bemf detection circuitry 138 and proceeds to accelerate the motor to the operational velocity (such as about 15,000 rpm). The routine then terminates at step 274.

Figure 11:
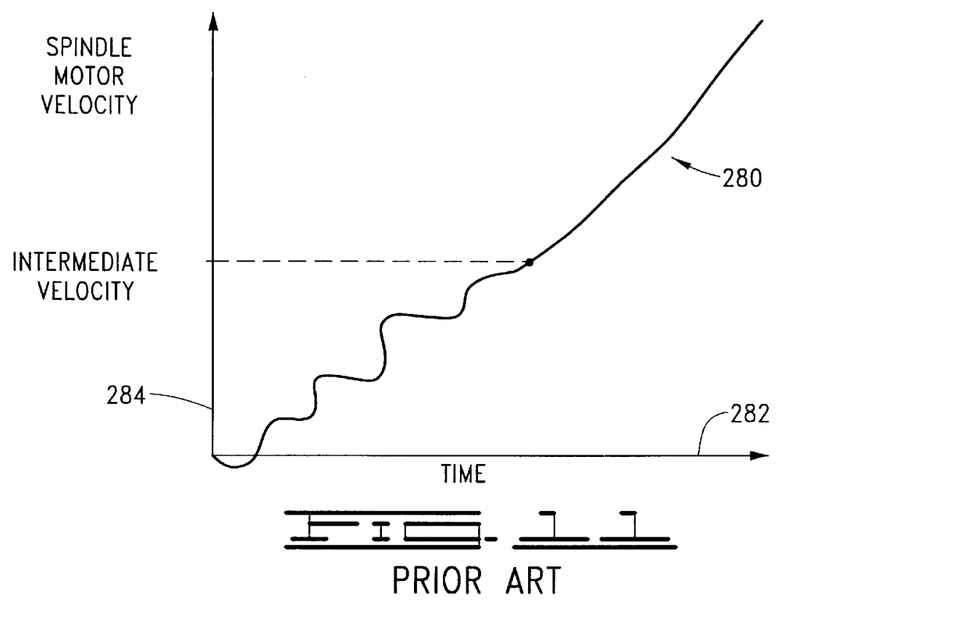
FIG. 11 provides a generalized graphical representation of a motor velocity profile obtained during acceleration of a spindle motor in accordance with the prior art.
Figure 12:
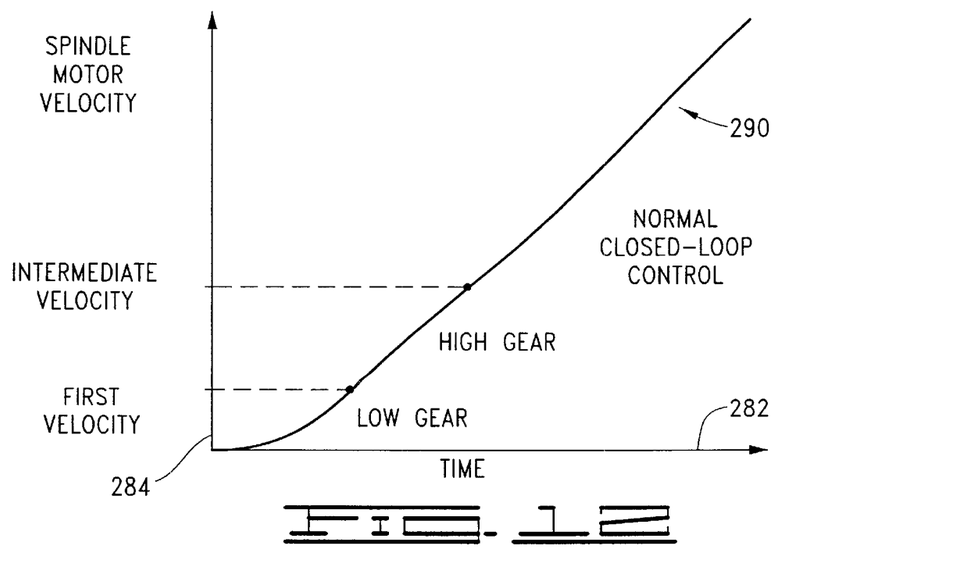
FIG. 12 provides a generalized graphical representation of a motor velocity profile obtained in accordance with preferred embodiments of the present invention.

FIGS. 11 and 12 graphically illustrate the manner in which the routine of FIG. 5 advantageously operates to accelerate the spindle motor 106 from rest to the operational velocity. FIG. 11 shows a prior art motor velocity curve 280 representative of data obtained from a drive accelerated generally in accordance with the methodology disclosed by the aforementioned Cassat U.S. Pat. No. 5,117,165 reference. The curve 280 is plotted against an elapsed time x-axis 282 and a spindle motor velocity y-axis 284.

As evidenced by FIG. 11, the spindle motor incurred significant variations as the spindle motor was accelerated from rest to the intermediate velocity. Surprisingly, it was observed that under certain circumstances the motor was actually caused to rotate for a short time in the wrong direction during spin up.

By contrast, FIG. 12 shows a motor velocity curve 290 representative of data obtained from a drive accelerated in accordance with the routine of FIG. 5. The velocity curve 290 shows smooth and continuous transition from low gear to high gear mode and from high gear mode to steady-state closed-loop control. A faster overall acceleration to the operational velocity was also achieved as compared to the prior art.

It will now be appreciated that the routine of FIG. 5 provides several advantages over the prior art. One advantage is that only one drive pulse is preferably applied to the spindle motor during each commutation period of the high gear mode. These drive pulses are preferably applied when the relative orientation of the rotor and stator are such that substantially maximum torque efficiency is achieved with each pulse.

Another advantage is the ability to use substantially longer duration drive pulses as compared to the prior art during high gear mode. This stems from a realization that, as the motor accelerates, it can be reasonably predicted when the next commutation state transition will occur. Thus, there is no need as in the prior art to apply multiple short drive pulses and to take intervening measurements while the motor is still rotating through the same state and the next state transition is still relatively far away. Rather, being able to generally predict when the next state transition will occur allows substantially longer pulses to be safely applied without fear of inadvertently continuing to apply a drive pulse after the spindle motor transitions to a new state (and thereby inducing undesirable cogging actions). The use of longer pulses has been found to significantly reduce the time required to accelerate the motor up to the intermediate velocity.

Another advantage is the amount of operational margin provided by the routine of FIG. 5. Although the operation during high gear mode does not rely on bemf detection from the spindle motor, the routine nevertheless is able to detect, with good resolution, the transition of the motor to each new state, and modify the duration of subsequent drive pulses accordingly. While the routine of FIG. 5 will not generally be able to achieve a final velocity approaching the final operational velocity achievable through bemf detection, it has nevertheless been demonstrated that the routine of FIG. 5 can sustain a velocity well in excess of that necessary to enable detection of the bemf from the spindle motor. Hence, it is contemplated that the routine of FIG. 5 will find enhanced utility with successive generations of higher speed spindle motors which require higher motor speeds before frequency lock can take place.

Finally, another advantage of the routine of FIG. 5 is the ability, in certain circumstances such as head flight testing, to closely maintain the rotation of the spindle motor at a desired velocity less than the intermediate velocity. More particularly, FIG. 5 promotes a methodology whereby a spindle motor velocity of, for example 500 rpm, can be readily maintained even though such level is wholly insufficient to allow bemf control of the spindle motor. This can be useful during engineering and manufacturing testing operations.

Accordingly, it will now be understood that the present invention, as embodied herein and as claimed below, is directed to a method and apparatus for accelerating a disc drive spindle motor from rest to an operational velocity. In accordance with preferred embodiments, a disc drive (such as 100) includes a spindle motor (such as 106), back electromagnetic force (bemf) detection circuitry (such as 138) which detects bemf from rotation of the spindle motor above a nominal rotational velocity, commutation circuitry (such as 140) which electrically commutates the spindle motor in relation to the detected bemf over a range of electrical rotational positions, and control circuitry (such as 120, 134) which controls the acceleration of the spindle motor.

During a low gear mode, the spindle motor is initially accelerated from rest to a first velocity by applying fixed duration drive pulses to the spindle motor (such as by step 248) and detecting successive spindle motor commutation state transitions as the spindle motor rotates through a range of commutation states (such as by step 254).

Once the first velocity is reached, a high gear mode is employed wherein the spindle motor is accelerated from the first velocity to an intermediate velocity by applying variable duration drive pulses to the spindle motor (such as by step 260) and detecting successive spindle motor commutation state transitions (such as by step 266). The variable duration of each successive drive pulse is established in relation to a most recent commutation period comprising the elapsed time between the two most recently detected state transitions.

Thereafter, the spindle motor is accelerated from the intermediate velocity to the operational velocity using the commutation circuitry and bemf detection circuitry (such as by step 272).

Preferably, operation during low gear mode includes steps of identifying the initial commutation state of the spindle motor while the spindle motor is at rest (such as by steps 202, 224), applying a fixed duration drive pulse to the spindle motor to rotate the spindle motor (such as by step 248), and repetitively measuring electrical rotational position of the spindle motor (such as by steps 250, 252) until a transition to the next commutation state is detected. The foregoing steps are repeated until the first velocity is reached.

Operation during high gear mode preferably includes steps of measuring the most recent commutation period (such as by step 258), calculating a drive pulse duration in relation to the most recent commutation period and a scale factor so that the drive pulse duration is less than the most recent commutation period, applying a drive pulse with the calculated drive pulse duration to the spindle motor (such as by step 260), and repetitively measuring electrical rotational position of the spindle motor (such as by steps 262, 264) until a transition to the next commutation state is detected. The foregoing steps are repeated until the intermediate velocity is reached. The scale factor can be a constant, or can vary in relation to variations in the rotational velocity of the spindle motor.

For purposes of the appended claims, the function of the recited "first means" element will be understood as being carried out by the disclosed structure including the control logic (134, FIG. 3) and the servo processor (130, FIG. 2) programmed in accordance with the routine of FIG. 5. Prior art systems and methods that fail to accelerate a spindle motor by applying drive pulses to the spindle motor and measuring electrical rotational position to detect successive spindle motor commutation state transitions, each said drive pulse having a variable duration established in relation to a most recent commutation period comprising the elapsed time between the two most recently detected state transition, each said drive pulse applied during a different commutation period, including the aforementioned Duffy U.S. Pat. No. 5,631,999 and Cassat U.S. Pat. No. 5,117,165 references are not encompassed by the element and are further excluded from the definition of an equivalent.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the motor start routine while maintaining the same functionality without departing from the spirit and scope of the invention.

In addition, although the embodiments described herein are generally directed to a motor start routine for a disc drive, it will be appreciated by those skilled in the art that the routine can be used for other devices to accelerate a rotatable member from rest without departing from the spirit and scope of the claimed invention.

What is claimed is:

1. A method for accelerating a brushless direct current (dc) spindle motor of a disc drive from rest to an operational velocity comprising steps of:
   (a) initially accelerating the spindle motor from rest to a first velocity by applying fixed duration drive pulses to the spindle motor and detecting successive spindle motor commutation state transitions as the spindle motor rotates through a range of commutation states;
   (b) subsequently accelerating the spindle motor from the first velocity to an intermediate velocity less than the operational velocity by applying variable duration drive pulses to the spindle motor and detecting successive spindle motor commutation state transitions without the use of back electromotive force (bemf) detected from the spindle motor, wherein the variable duration of each successive drive pulse is established in relation to a most recent commutation period comprising the elapsed time between the two most recently detected state transitions, and wherein a single one of the variable duration drive pulses is applied during each commutation period; and
   (c) accelerating the spindle motor from the intermediate velocity to the operational velocity using bemf detected from the spindle motor.

2. The method of claim 1, wherein the disc drive comprises back electromagnetic force (bemf) detection circuitry which detects bemf from rotation of the spindle motor above the intermediate velocity and commutation circuitry which electrically commutates the spindle motor in relation to the detected bemf over the range of commutation states, and wherein step (c) comprises a step of using the bemf detection circuitry and the commutation circuitry to accelerate the spindle motor from the intermediate velocity to the operational velocity in relation to the bemf detected from the spindle motor.

3. The method of claim 1, wherein step (a) comprises steps of:
   (a1) identifying the initial commutation state of the spindle motor while the spindle motor is at rest;

(a2) applying a fixed duration drive pulse to the spindle motor to rotate the spindle motor;

(a3) repetitively measuring electrical rotational position of the spindle motor until a transition to the next commutation state is detected; and (a4) repeating steps (a2) and (a3) until the first velocity is reached.

4. The method of claim 3, wherein the electrical rotational position of the spindle motor is determined during step (a3) by steps of:

(a3i) sequentially applying sense pulses to the spindle motor; and (a3ii) measuring a corresponding rise time for a resulting voltage induced by application of each said sense pulse, said rise time determined in relation to impedance of the spindle motor determined in turn by the electrical rotational position of the spindle motor.

5. The method of claim 1, wherein step (b) comprises steps of:

(b1) measuring the most recent commutation period;

(b2) calculating a drive pulse duration in relation to the most recent commutation period and a scale factor so that the drive pulse duration is less than the most recent commutation period;

(b3) applying a drive pulse with the calculated drive pulse duration of step (b2) to the spindle motor;

(b4) repetitively measuring electrical rotational position of the spindle motor until a transition to the next commutation state is detected; and (b5) repeating steps (b1) through (b4) until the intermediate velocity is reached.

6. The method of claim 5, wherein the electrical rotational position of the spindle motor is determined during step (b4) by steps of:

(b4i) sequentially applying sense pulses to the spindle motor; and (b4ii) measuring a corresponding rise time for a resulting voltage induced by application of each said sense pulse, said rise time determined in relation to impedance of the spindle motor determined in turn by the electrical rotational position of the spindle motor.

7. The method of claim 5, wherein the scale factor used to calculate the drive pulse duration during step (b2) is a constant.

8. The method of claim 5, wherein the scale factor used to calculate the drive pulse duration during step (b2) varies in relation to the rotational velocity of the spindle motor as the spindle motor accelerates from the first velocity to the intermediate velocity.

9. A disc drive, comprising:

a brushless direct current (dc) spindle motor configured to rotate at least one recording disc;

a read/write head configured to write data to the disc and read data from the disc as the spindle motor is rotated at a final operational velocity;

back electromagnetic force (bemf) detection circuitry coupled to the spindle motor and which detects bemf from rotation of the spindle motor above a medium velocity, the medium velocity less than the final operational velocity;

commutation circuitry coupled to the bemf detection circuitry and spindle motor which electrically commutates the spindle motor in relation to the detected bemf over a range of commutation states of the spindle motor; and a control circuit which accelerates the spindle motor by applying variable duration drive pulses to the spindle motor and measuring electrical rotational position to detect successive spindle motor commutation state transitions without relying upon bemf from the spindle motor, wherein the variable duration of each successive drive pulse is established in relation to a most recent commutation period comprising the elapsed time between the two most recently detected state transitions, and wherein each of the variable duration drive pulses is applied during a different commutation period.

10. The disc drive of claim 9, wherein the control circuit subsequently directs the bemf detection circuitry and the commutation circuitry to accelerate the spindle motor from the medium velocity to the final operational velocity in relation to the detected bemf from the spindle motor.

11. The disc drive of claim 9, further comprising spindle driver circuitry coupled to the spindle motor and the commutation circuitry and which applies drive pulses to each of a plurality of windings of the spindle motor in response to commutation pulses from the commutation circuitry to rotate the spindle motor, wherein the control circuit identifies the electrical rotational position of the spindle motor by directing the spindle driver to sequentially apply a sense pulse to each of a plurality of windings of the spindle motor and measuring a corresponding rise time for a resulting voltage induced by inductance of said windings in relation to the electrical rotational position of the spindle motor.

12. The disc drive of claim 11, wherein the spindle driver circuitry comprises:

a sense resistor connected in series between the plurality of windings of the spindle motor and ground; and a comparator having a positive input and a negative input, the positive input connected in parallel with the sense resistor to receive a motor sense voltage and the negative input connected to receive a reference threshold voltage, wherein the comparator outputs a pulse when the motor sense voltage reaches the reference threshold voltage, and wherein the control circuit determines the rise time in relation to the pulse output by the comparator.

13. The disc drive of claim 9, wherein the control circuit comprises control logic coupled to the commutation circuitry and the bemf detection circuitry, and a top level programmable processor coupled to the control logic and which further directs the transfer of data between the disc and the host device.

14. A disc drive, comprising:

a spindle motor configured to rotate at least one recording disc;

a read/write head configured to write data to the disc and read data from the disc as the spindle motor is rotated at a final operational velocity;

back electromagnetic force (bemf) detection circuitry coupled to the spindle motor and which detects bemf from rotation of the spindle motor above a medium velocity, the medium velocity less than the final operational velocity;

commutation circuitry coupled to the bemf detection circuitry and spindle motor which electrically commutates the spindle motor in relation to the detected bemf over a range of electrical rotational positions of the spindle motor; and first means for accelerating the spindle motor by applying drive pulses to the spindle motor and measuring electrical rotational position to detect successive spindle motor commutation state transitions, each said drive pulse having a variable duration established in relation to a most recent commutation period comprising the elapsed time between the two most recently detected state transition, each said drive pulse applied during a different commutation period.

15. The disc drive of claim 14, wherein the first means comprises control logic coupled to the commutation circuitry and the bemf detection circuitry, and a top level programmable processor coupled to the control logic and which further directs the transfer of data between the disc and the host device.

* * * * *